United States Patent
Lee (10) Patent No.: US 10,177,634 B2
(45) Date of Patent: Jan. 8, 2019

(54) STRUCTURE FOR SLIP RING AND BRUSH OF WOUND ROTOR SYNCHRONOUS MOTOR

(71) Applicant: MANDO Corporation, Pyeongtaek-si, Gyeonggi-do (KR)

(72) Inventor: Chung Seong Lee, Uiwang-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 216 days.

(21) Appl. No.: 15/172,087

(22) Filed: Jun. 2, 2016

(65) Prior Publication Data

US 2016/0365776 A1   Dec. 15, 2016

(30) Foreign Application Priority Data

Jun. 9, 2015   (KR) .................. 10-2015-0081482

(51) Int. Cl.
*H02K 19/12*   (2006.01)
*H02K 13/10*   (2006.01)
(Continued)

(52) U.S. Cl.
CPC ............. *H02K 13/10* (2013.01); *H01R 39/18* (2013.01); *H02K 1/26* (2013.01); *H02K 3/46* (2013.01);
(Continued)

(58) Field of Classification Search
CPC ........ H02K 1/26; H02K 11/215; H02K 19/12; H02K 3/46; H02K 23/20; H02K 13/10;
(Continued)

(56) References Cited

U.S. PATENT DOCUMENTS 5,734,218 A * 3/1998 Crockett ............... H01R 39/08
29/597
6,517,357 B1 * 2/2003 Athanasiou ........... H01R 39/64
439/26

(Continued)

FOREIGN PATENT DOCUMENTS

KR   10-1995-0030444 A   11/1995
KR   100178158 B1   5/1999
(Continued)

OTHER PUBLICATIONS

Korean Office Action dated Aug. 22, 2016 in connection with the counterpart Korean Patent Application No. 10-2015-0081482, citing the above reference(s).

*Primary Examiner* — Thomas Truong
*Assistant Examiner* — Leda Pham
(74) *Attorney, Agent, or Firm* — Hauptman Ham, LLP (57) ABSTRACT

Provided is a structure for a slip ring and a brush of a WRSM capable of reducing an axial length of a motor by increasing a contact area between the slip ring and the brush and improving reliability for smoothly implementing performance of the motor by stably supporting a shaft of the motor, the structure including: an inner slip ring combined with a rotation shaft of a motor; a brush disposed at a circumference of the inner slip ring and having a plurality of wrinkles contacting an outer circumferential surface of the inner slip ring formed therein; an outer slip ring disposed at a circumference of the brush and making in contact with the plurality of wrinkles of the brush; and a holder that supports the outer slip ring.

15 Claims, 9 Drawing Sheets

(51) Int. Cl.
  *H02K 11/215* (2016.01)
  *H02K 1/26* (2006.01)
  *H02K 3/46* (2006.01)
  *H02K 13/00* (2006.01)
  *H01R 39/18* (2006.01)
  *H01R 39/36* (2006.01)
  *H01R 39/64* (2006.01)

(52) U.S. Cl.
  CPC ......... *H02K 11/215* (2016.01); *H02K 13/003* (2013.01); *H02K 19/12* (2013.01); *H01R 39/36* (2013.01); *H01R 39/64* (2013.01)

(58) Field of Classification Search
  CPC ...... H02K 13/003; H01R 39/08; H01R 39/38; H01R 39/39; H01R 39/18; H01R 39/28; H01R 39/34
  USPC .............. 310/148, 232, 242, 248; 439/13
  See application file for complete search history.

(56) References Cited

U.S. PATENT DOCUMENTS

| | | | | |
|---|---|---|---|---|
| 2003/0137210 | A1* | 7/2003 | Southall | H01F 41/0266 310/232 |
| 2004/0242025 | A1* | 12/2004 | Angerpointner | H01R 43/10 439/13 |
| 2008/0030100 | A1* | 2/2008 | Ogi | H01R 39/40 310/245 |
| 2009/0091208 | A1* | 4/2009 | Yu | H01R 39/08 310/232 |

FOREIGN PATENT DOCUMENTS

| | | |
|---|---|---|
| KR | 1020000055497 A | 9/2000 |
| KR | 10-0283556 B1 | 3/2001 |
| KR | 10-2010-0034844 A | 4/2010 |

\* cited by examiner

STRUCTURE FOR SLIP RING AND BRUSH OF WOUND ROTOR SYNCHRONOUS MOTOR

CROSS-REFERENCE TO RELATED APPLICATION

This application claims priority to and the benefit of Korean Patent Application No. 10-2015-0081482, filed on Jun. 9, 2015, the disclosure of which is incorporated herein by reference in its entirety.

BACKGROUND

1. Field of the Invention

The present invention relates to a structure for a slip ring and a brush of a wound rotor synchronous motor (WRSM), and more particularly, to a structure for a slip ring and a brush of a WRSM capable of reducing an axial length of a motor by increasing a contact area between the slip ring and the brush and improving reliability for smoothly implementing performance of the motor by stably supporting a shaft of the motor.

2. Discussion of Related Art

In general, a hybrid car or an electric car that has been mentioned as an eco-friendly car, is driven by an electric motor that obtains a rotational force using electric energy.

The hybrid car drives in an electric vehicle (EV) mode that is a pure electric car mode in which only power of the electric motor is used, or in a hybrid electric vehicle (HEV) mode in which both an engine and a rotational force of a driving motor are used as power. The conventional electric car drives using the rotational force of the driving motor as power.

In this way, the driving motor used as a power source for the eco-friendly car is usually a permanent magnetic synchronous motor (PMSM). The PMSM is required to maximize performance of a permanent magnet so as to show the maximum performance on a limited layout condition.

Here, neodymium (Nd) in the permanent magnet is used to improve an intensity of the permanent magnet, and dysprosium (Dy) is used to improve a high-temperature demagnetization resistance. However, rare-earth metals in the permanent magnet, such as Nd and Dy, are limitedly buried in some countries including China, etc. and are very expensive and have severe price fluctuation.

In order to overcome these disadvantages, the use of an induction motor has been examined. However, there is a limitation in excessive increment in sizes, such as volume, weight, and the like, so as to show the same motor performance.

Meanwhile, in related industry, development for a wound rotor synchronous motor (WRSM) that replaces a PMSM as an electric motor used as the power source for the eco-friendly car has been more briskly carried out.

The WRSM is capable of showing performance of a motor with an optimal increase of about 10% compared to the PMSM. The WRSM replaces a permanent magnet of the PMSM by winding a coil around a rotor and making the rotor in a state of an electromagnet when a current is applied to the coil.

The WRSM is configured in such a way that a coil is wound around the rotor so as to generate a magnetic flux in the rotor and a brush and a slip ring are provided outside a housing of the motor so as to generate a magnetic flux by flowing a current through the coil and the current is applied to the coil through the brush and the slip ring.

Meanwhile, the WRSM is configured in such a way that the brush is always maintained in mechanical contact with an outer circumferential surface of the slip ring so that a direct current (DC) is applied to the wound coil, and for continuous mechanical contact between the brush and the slip ring, an end of one side of the brush is elastically supported by a spring and the brush is maintained in a continuous contact state with the outer circumferential surface of the slip ring due to an elastic force of the spring and a current is transferred to the coil.

However, in the conventional structure for a slip ring and a brush of a WRSM, a contact area between the slip ring and the brush for applying a DC is relatively small compared to the entire area of the slip ring such that a contact resistance increases when a high current is input to the coil through the brush and thus, heat dissipation and loss occur in the motor. Also, friction and abrasion occur in the contact surface due to repetitive mechanical contact between the brush and the slip ring, and due to such friction and abrasion, foreign substances, such as metal powder, are formed such that a spark, etc., occurs and the durable reliability of the motor is lowered.

Furthermore, when the slip ring extends in an axial direction and the axial length of the slip ring is increased so that a sufficient contact area between the brush and the slip ring is obtained, the contact area between the slip ring and the brush is increased but, due to an increase in the axial length of the slip ring, the size of the motor may be excessively increased.

PRIOR ART DOCUMENTS

Patent Documents

Patent document 1: Korean Patent Registration No. 10-0178158 (published on Nov. 20, 1998)

Patent document 2: Korean Patent Laid-open Publication No. 2000-0055497 (published on Sep. 5, 2000)

SUMMARY OF THE INVENTION

The present invention is directed to a structure for a slip ring and a brush of a wound rotor synchronous motor (WRSM) capable of preventing heat dissipation and loss of the motor when a high current is input to the motor through the brush by increasing a contact area between the brush and the slip ring of the WRSM.

The present invention is also directed to a structure for a slip ring and a brush of a wound rotor synchronous motor (WRSM) capable of improving reliability of smooth driving of the motor by equally distributing contact surfaces between the brush and the slip ring in a circumferential direction of the slip ring so that, even though a part of the contact surfaces is abraded, the other part of the contact surfaces is used to supplement the abraded part.

The present invention is also directed to a structure for a slip ring and a brush of a wound rotor synchronous motor (WRSM) capable of improving durable reliability of the motor by discharging foreign substances generated by repetitive mechanical friction and abrasion of the brush and the slip ring toward an outside of the motor.

The present invention is also directed to a structure for a slip ring and a brush of a wound rotor synchronous motor (WRSM) capable of reducing an axial length of the slip ring by increasing a contact area between the slip ring and the brush and reducing the overall axial size of the motor.

The present invention is also directed to a structure for a slip ring and a brush of a wound rotor synchronous motor (WRSM) capable of performing a damping function when a shaft of the motor shakes and improving a support strength of the shaft of the motor by stably supporting the shaft of the motor in all directions.

The object of the present invention is not limited to the described above, and other objects not described may be apparently understood from the following description by those skilled in the art.

According to an aspect of the present invention, there is provided a structure for a slip ring and a brush of a wound rotor synchronous motor (WRSM), the structure including: an inner slip ring combined with a rotation shaft of a motor; a brush disposed at a circumference of the inner slip ring and having a plurality of wrinkles contacting an outer circumferential surface of the inner slip ring formed therein; an outer slip ring disposed at a circumference of the brush and making in contact with the plurality of wrinkles of the brush; and a holder that supports the outer slip ring.

The wrinkles of the brush may be arranged in a circumferential direction at equal intervals and may be in contact with the outer circumferential surface of the inner slip ring and an inner circumferential surface of the outer slip ring, respectively.

Accommodation grooves in which the inner slip ring, the brush and the outer slip ring are accommodated, may be formed in the holder.

Foreign substance discharge ports perforated in an axial direction to communicate with the accommodation grooves may be formed in the holder.

A fan that induces forcible discharge of foreign substances through the foreign substance discharge ports may be installed at the motor.

The holder may be press-fitted into and combined with the motor. Pin grooves into which pins are press-fitted, may be formed in the holder so that a position of the holder press-fitted into the motor is fixed.

Magnetic bodies may be installed between the inner slip ring and the brush, and a sensor for detecting positions of the magnetic bodies may be installed at the holder.

The magnetic bodies may be formed by injecting moldable magnetic materials between the inner slip ring and the brush.

The sensor may be a hall sensor that may detect positions of the magnetic bodies using a hall effect.

The structure may further include wires for applying a current to the outer slip ring, and the wires may be integrally installed in the holder together with wires for supplying power to the sensor.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, a structure for a slip ring and a brush of a wound rotor synchronous motor (WRSM) according to exemplary embodiments of the present invention will be described in detail with reference to the accompanying drawings.

Figure 1:
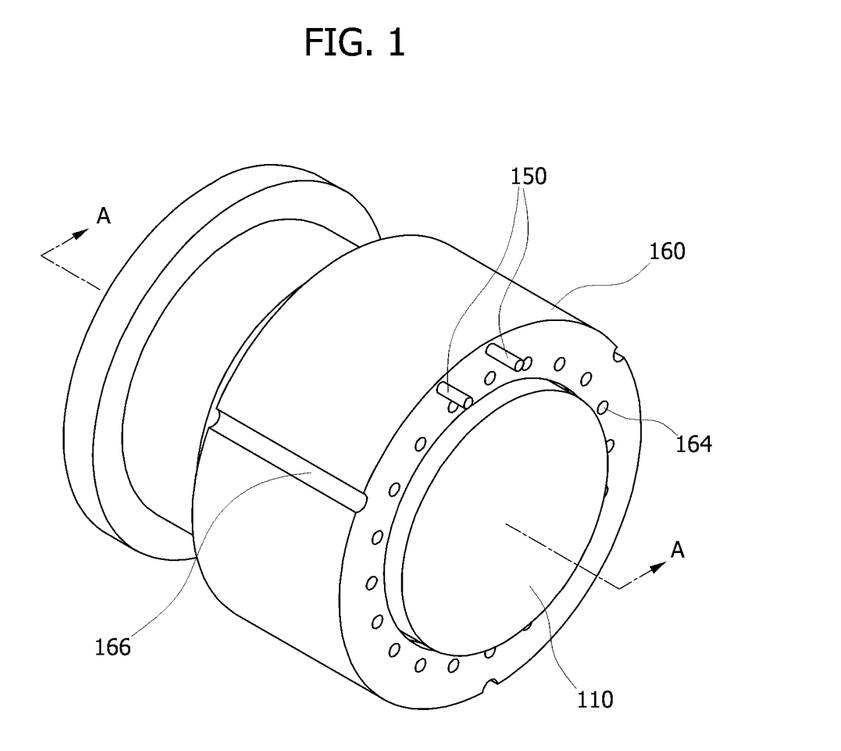
FIG. 1 is a perspective view illustrating a structure for a slip ring and a brush of a wound rotor synchronous motor (WRSM) according to an embodiment of the present invention.
Figure 2:
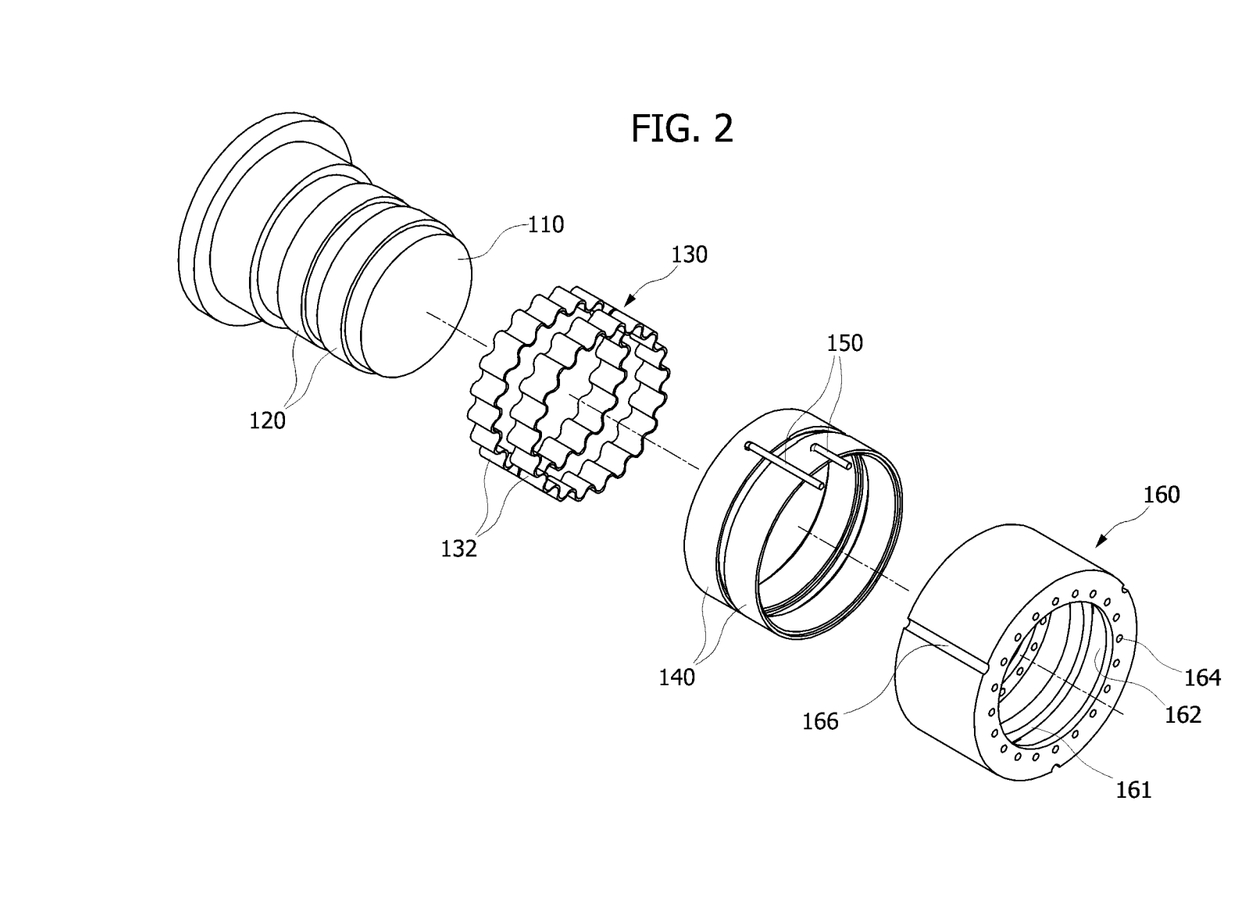
FIG. 2 is an exploded perspective view of FIG. 1.
Figure 3:
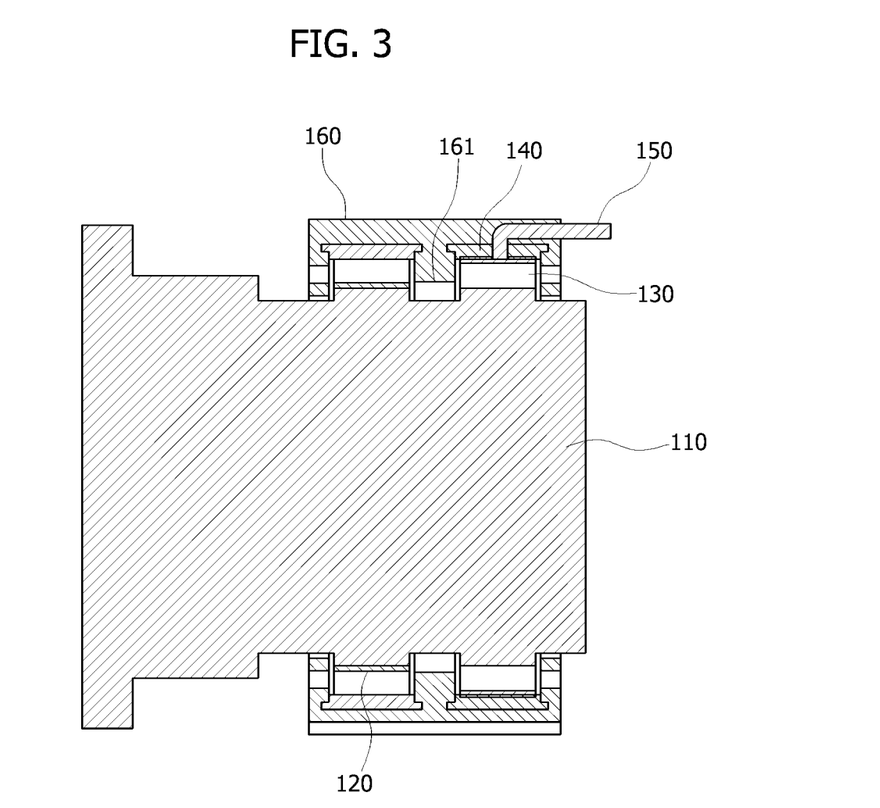
FIG. 3 is a cross-sectional view taken along line A-A of FIG. 1.
Figure 4:
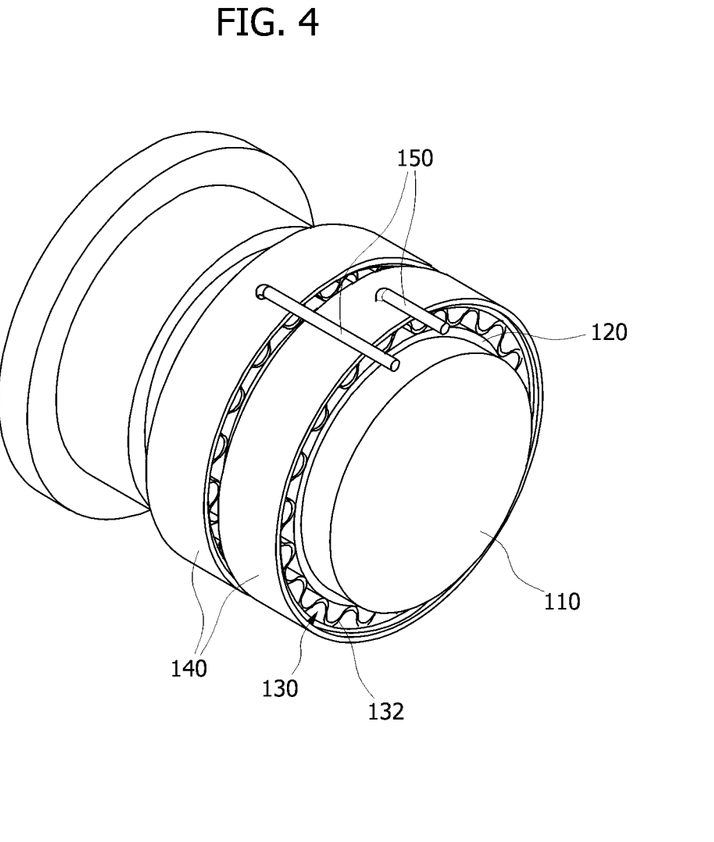
FIG. 4 is a perspective view illustrating details of a combined structure for an inner slip ring, a brush, and an outer slip ring by omitting a holder from the structure illustrated in FIG. 1.
Figure 5:
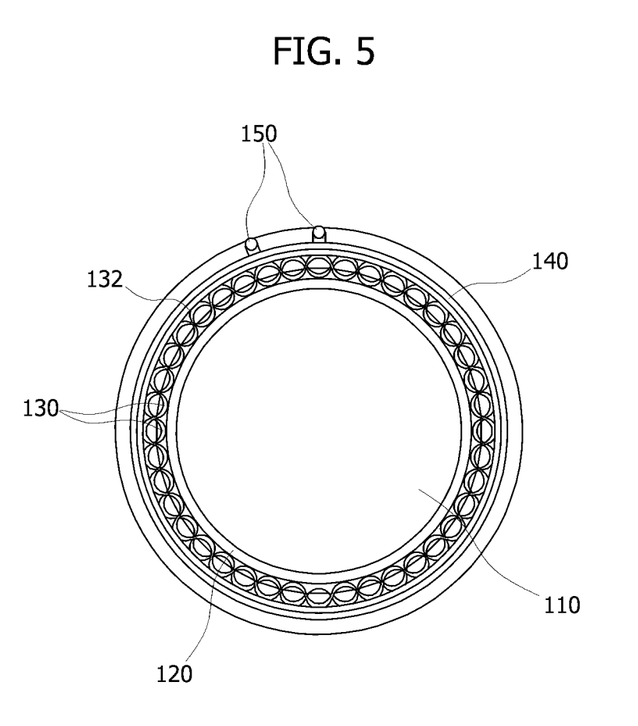
FIG. 5 is a front view of FIG. 4.
Figure 6:
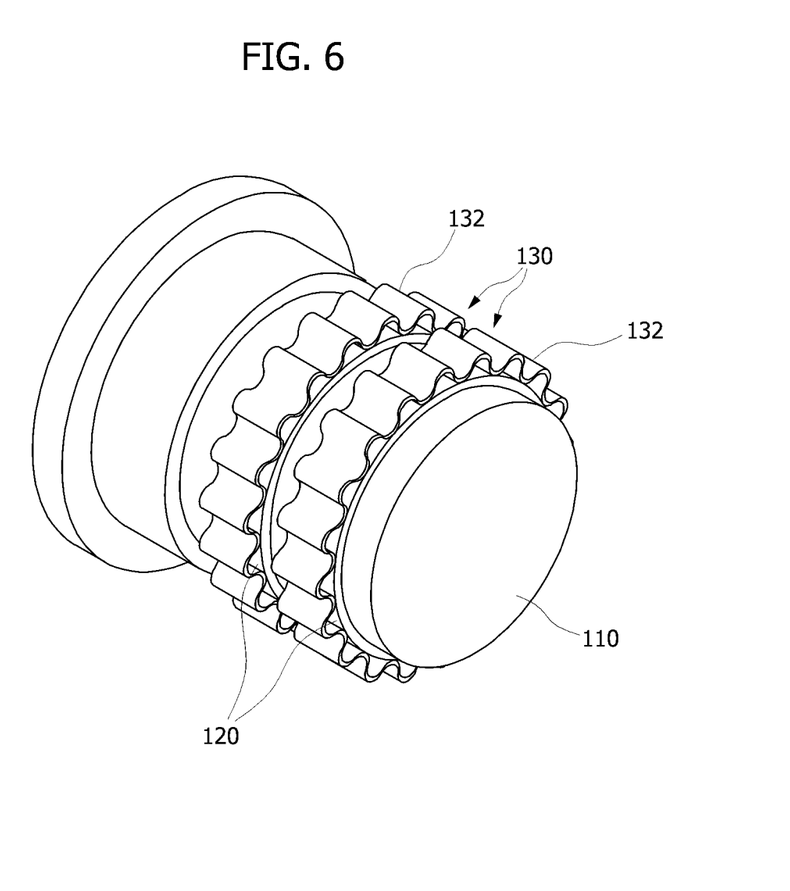
FIG. 6 is a perspective view illustrating details of a combined structure for the brush and the inner slip ring by omitting the outer slip ring from the combined structure of FIG. 4.

FIG. 1 is a perspective view illustrating a structure for a slip ring and a brush of a wound rotor synchronous motor (WRSM) according to an embodiment of the present invention, which is an excerpt of the slip ring and the brush combined with a rotation shaft of a motor and a holder that encompasses and supports the slip ring and the brush. Also, FIG. 2 is an exploded perspective view of FIG. 1, and FIG. 3 is a cross-sectional view taken along line A-A of FIG. 1. Furthermore, FIG. 4 is a perspective view illustrating details of a combined structure for an inner slip ring, a brush, and an outer slip ring by omitting a holder from the structure illustrated in FIG. 1, and FIG. 5 is a front view of FIG. 4. Also, FIG. 6 is a perspective view illustrating details of a combined structure for the brush and the inner slip ring by omitting the outer slip ring from the combined structure of FIG. 4.

Referring to FIGS. 1 through 6, the structure for the slip ring and the brush of the WRSM according to an embodiment of the present invention includes an inner slip ring 120 combined with a rotation shaft 110 of the motor, a brush 130 disposed at an outside of the inner slip ring 120, an outer slip ring 140 disposed at an outside of the brush 130, wires 150 for applying a current to the outer slip ring 140, and a holder 160 that supports the outer slip ring 140.

The inner slip ring 120 that is a current transfer medium for applying a current to a coil wound around a rotor (not shown) of the motor is formed to have a shape of a circular ring having a small thickness in which an axial length of the inner slip ring 120 is reduced compared to the conventional structure for a slip ring installed at the conventional motor.

Two inner slip rings 120 are provided, are spaced a predetermined distance apart from each other in an axial direction, are press-fitted into, combined with and fixed to an outer circumferential surface of the rotation shaft 110 of the motor.

The two inner slip rings 120 press-fitted into the rotation shaft 110 of the motor in this way are connected to a positive (+) pole and a negative (−) pole of the coil wound around the rotor of the motor, respectively, and are rotated as the rotation shaft 110 of the motor is rotated.

Meanwhile, each of two brushes 130 is disposed in contact with an outer circumferential surface of each of the inner slip rings 120.

Each of the brushes 130 is formed to have a bellows type brush structure in which the entire shape of the brushes 130 is repetitively wrinkled in a wave form in a circumferential direction, as illustrated in FIG. 2.

In this case, wrinkles 132 formed in the brushes 130 are arranged in the circumferential direction at equal intervals.

When viewed from the front of the rotation shaft 110, as illustrated in FIG. 5, the wrinkles 132 of one-side brush 130 are disposed to cross the wrinkles 132 of the other-side brush 130.

This is to produce equal friction between each of the brushes 130 and each of the inner slip rings 120 when the rotation shaft 110 of the motor rotates.

Also, ends of insides of the wrinkles 132 of each of the brushes 130 are maintained in contact with the outer circumferential surface of each of the inner slip rings 120 in a state in which each of the brushes 130 is disposed at a circumference of each of the inner slip rings 120.

Thus, while the rotation shaft 110 of the motor rotates, each of the brushes 130 is maintained in slide contact with each of the inner slip rings 120 at an inside of each of the brushes 130, and a current flows through each of the inner slip rings 120 that contacts the wrinkles 132 of each of the brushes 130 so that the current is applied to the coil wound around the rotor of the motor and a magnetic flux for rotation is generated.

Each of the brushes 130 is manufactured by sintering graphite and copper, as in the conventional brush. The graphite material thereof serves as a lubricant when slide friction between each of the brushes 130 and each of the inner slip rings 120 is produced.

Also, in the structure for the bellows type brush 130, the formation cycle and the number of the wrinkles 132 may be differently set according to the size of the diameter of each of the brushes 130 installed at the rotation shaft 110 of the motor.

That is, the number of the brushes 130 and the formation length of the wrinkles 132 may be differently designed to be suitable for a support strength of the rotation shaft 110 of the motor and a contact area between each of the brushes 130 and each of the inner slip rings 120.

Also, as two bellows type brushes 130 are installed in an axial direction of the motor, a damping function can be equally maintained in a radial direction against shaking of a motor shaft due to an external load of the motor shaft, an electromagnetic force of the motor, an eccentric motion of a motor rotation body, etc., compared to a case where one bellows type brush 130 is installed, and the motor shaft can be equally supported.

Furthermore, when the structure for the bellows type brush 130 is used, equal friction and abrasion between each of the brushes 130 and each of the slip rings 120 and 140 occur so that the durable reliability of the motor can be improved.

Meanwhile, the outer slip ring 140 that is a medium for transferring a current to the brush 130 is disposed at a circumference of the brush 130.

An inner circumferential surface of the outer slip ring 140 is in contact with ends of outsides of the wrinkles 132 formed in the brush 130.

Thus, while the rotation shaft 110 of the motor rotates, the outer slip ring 140 is maintained in slide contact with outer parts of the wrinkles 132 of the brush 130, and a current is transferred to the brush 130 through the contact parts.

Also, the wires 150 are disposed in the outer slip ring 140 so that a current can be applied to the wires 150 from the outside.

In this case, the wires 150 may be connected to one side of the outer slip ring 140 using a method, such as spot welding, fusing, or the like.

In this case, no welding beads may be generated at an inner circumferential surface of the outer slip ring 140 that contacts the brush 130.

Through this structure, when a positive (+) current is applied to one of the wires 150 disposed in two outer slip rings 140 arranged in the axial direction and a negative (−) current is applied to the other one of the wires 150, the positive (+) current and the negative (−) current are applied to the coil of the rotor through the brush 130 and the inner slip ring 120 that are sequentially in contact with the outer slip ring 140 so that a magnetic flux for driving the motor is generated.

Meanwhile, the holder 160 is combined with a housing (not shown) of the motor so as to encompass and protect the inner slip ring 120, the brush 130, and the outer slip ring 140 that are sequentially combined with the rotation shaft 110 of the motor.

In this case, two accommodation grooves 162 are formed at an inside of the holder 160 in a state in which a partition wall 161 is disposed between the two accommodation grooves 162.

The two accommodation grooves 162 form an annular space portion in which two sets of current transfer mediums including the outer slip ring 140, the brush 130 and the inner slip ring 120 arranged in the axial direction can be respectively accommodated.

In this case, a plurality of foreign substance discharge ports 164 perforated in the axial direction to communicate with each of the accommodation grooves 162 are formed in front and rear surfaces of the holders 160 disposed perpendicularly to the axial direction of the holder 160 so that metal foreign substances generated due to repetitive friction and abrasion between the brush 130 and each of the slip rings 120 and 140 can be discharged to the outside of the holder 160.

In this case, the plurality of foreign substance discharge ports 164 are disposed in the front and rear surfaces of the holder 160 in the circumferential direction at equal intervals.

Also, a fan (not shown) may be installed at the rotor of the motor so as to smoothly discharge the foreign substances through the foreign substance discharge ports 164.

That is, the foreign substances in the accommodation grooves 162 are forcibly discharged to the outside through the foreign substance discharge ports 164 using a blowing force of the fan that rotates in communication with the rotor so that smooth discharge of the foreign substances can be induced.

The holder 160 having the above configuration may be manufactured of reinforced plastics or engineering plastics in consideration of strength and elasticity.

The holder 160 is combined with a housing of the motor using a press-fit method. In this case, the holder 160 is combined with the housing of the motor by press-fitting pins (not shown) between the housing of the motor and the holder 160 so that the holder 160 press-fitted into the housing of the motor can be fixed in a predetermined position not to move.

To this end, a plurality of pin grooves 166 into which the pins may be press-fitted, are formed in an outer surface of the holder 160 and in an inner surface of the housing of the motor into which the holder 160 is press-fitted.

The pin grooves 166 are formed in the outer surface of the holder 160 and the inner surface of the housing of the motor to have semicircular cross-sectional shapes, and in a state in which the holder 160 is press-fitted into the housing of the motor, the pins are press-fitted into the pin grooves 166 formed in the holder 160 and in both sides of the housing of the motor so that the position of the holder 160 can be fixed.

In this way, as the holder 160 is combined with the housing of the motor by press-fitting the pins into the pin grooves 166 formed in the outer surface of the holder 160 and the inner surface of the housing of the motor, the holder 160 does not easily escape from the housing of the motor but can be fixed even when an external force is applied to the holder 160.

Because the above-described holder 160 performs the same function as that of a bearing that supports a part of the rotation shaft 110 of the motor in a state in which the holder 160 is combined with the housing of the motor, the size of a shaft bearing provided at the rotation shaft 110 of the motor can be reduced compared to the conventional art.

When the structure for the slip ring and the brush of the WRSM having the above-described configuration according to the present invention is employed in an alternator for a vehicle, real-time position detection of the rotor that rotates inside the alternator has to be performed so that an accurate engine output assistance function can be implemented.

However, in the conventional structure for a brush and a slip ring of a WRSM, there are many difficulties in implementing an optimized vehicle package due to the lack of a mounting space for the position detector mounted to detect the position of the rotor.

To solve the problem, in the present invention, a simple configuration for position detection of the rotor is additionally installed in the structure for the slip ring and the brush according to the above-described embodiment so that a scheme for implementing a structure for a slip ring and a brush having a simple module shape in which position detection of the rotor is possible, is suggested.

Figure 7:
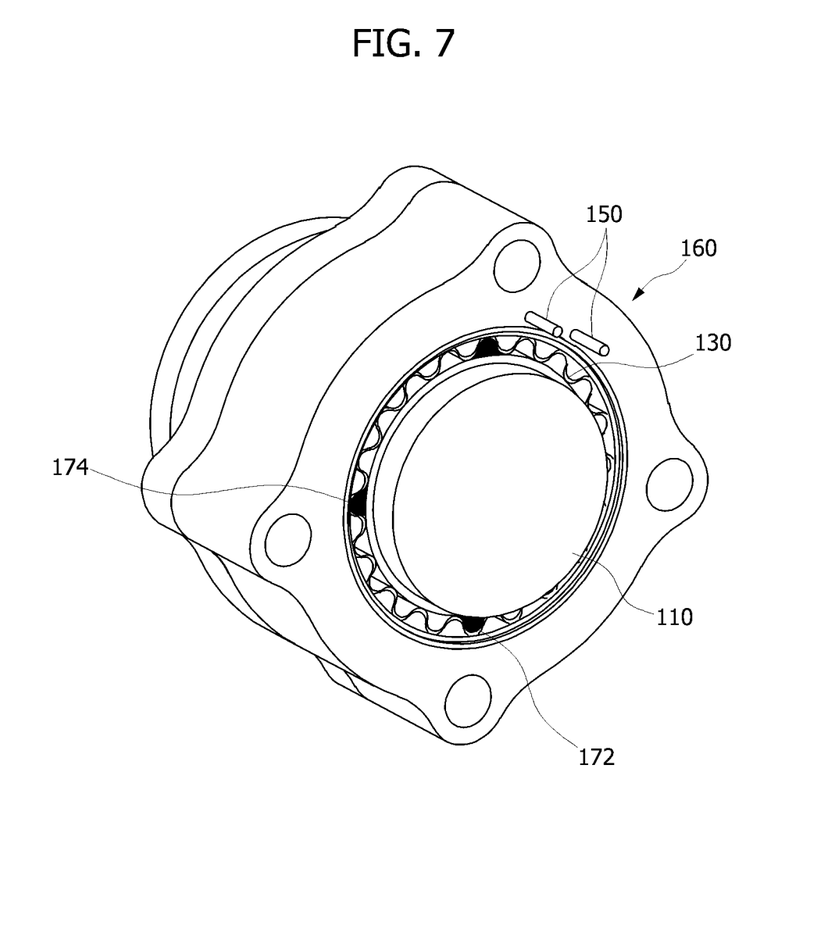
FIG. 7 is a perspective view illustrating a structure for a slip ring and a brush of a WRSM according to another embodiment of the present invention.
Figure 8:
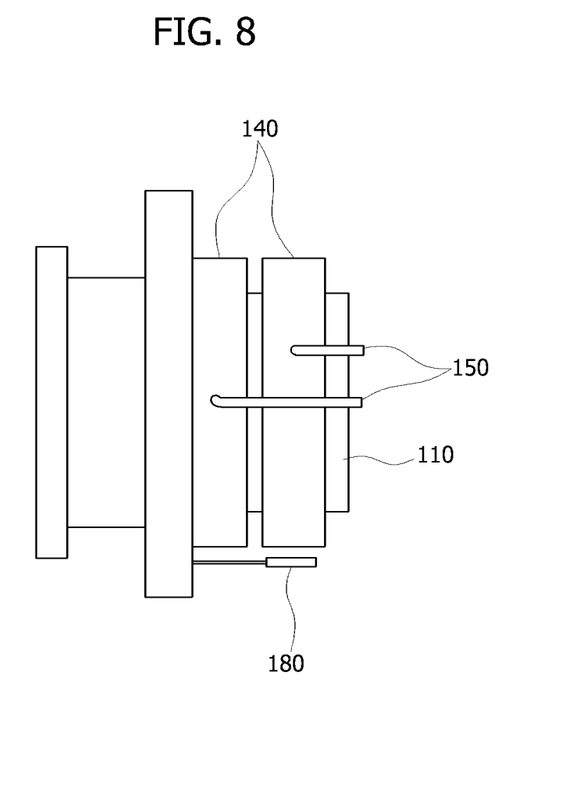
FIG. 8 is a side view of FIG. 7.
Figure 9:
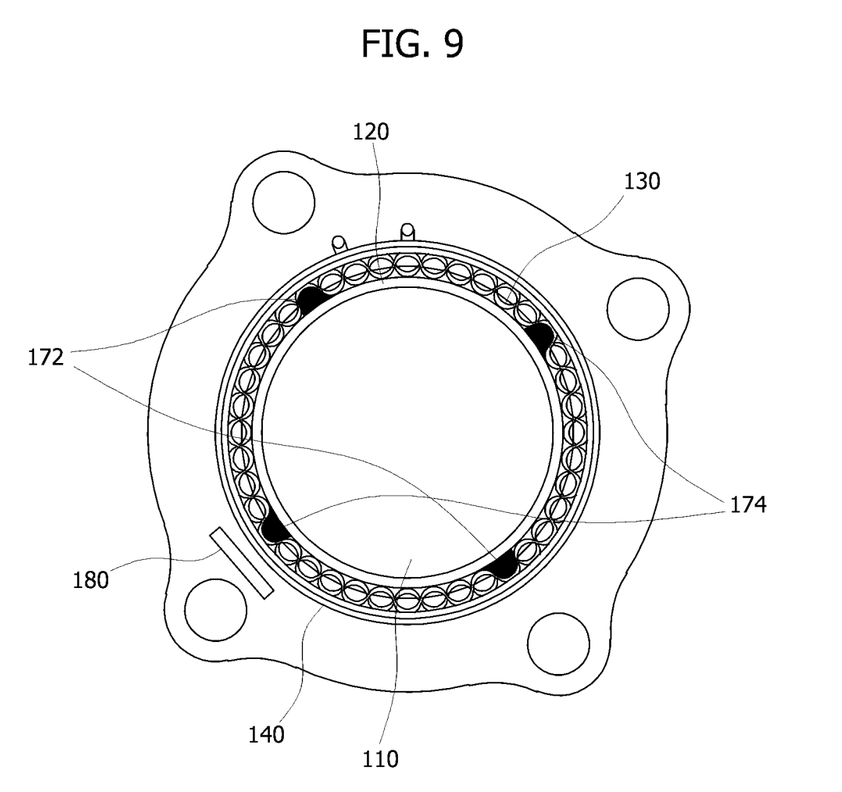
FIG. 9 is a front view of FIG. 7.

FIG. 7 is a perspective view illustrating a structure for a slip ring and a brush of a WRSM according to another embodiment of the present invention, FIG. 8 is a side view of FIG. 7, and FIG. 9 is a front view of FIG. 7.

Referring to FIGS. 7 through 9, the structure for the slip ring and the brush of the WRSM according to another embodiment of the present invention includes magnetic bodies 172 and 174 provided between the inner slip ring 120 and the brush 130 so as to detect the position of the rotor and a sensor 180 for detecting positions of the magnetic bodies 172 and 174 that rotate integrally with the rotation shaft 110 of the motor, which are additionally provided in the structure for the slip ring and the brush having the above-described shape according to an embodiment of the present invention.

In this case, the magnetic bodies 172 and 174 are formed of moldable magnetic materials, and the moldable magnetic materials are injected between the inner slip ring 120 and the brush 130 so that the magnetic bodies 172 and 174 can be formed.

In this way, each of the magnetic bodies 172 and 174 formed between the inner slip ring 120 and the brush 130 through injection of the magnetic materials includes an N-pole and an S-pole. As illustrated in FIG. 9, a pair of N-pole and S-pole magnetic bodies 172 and 174 may be disposed at an outside of the rotation shaft 110 to face each other. In this case, the magnetic bodies 172 and 174 may be configured through several combinations according to the number of poles provided in the rotor.

Due to the magnetic bodies 172 and 174 molded between the inner slip ring 120 and the brush 130, a space between the inner slip ring 120 and the brush 130 is maintained in a fixed state. Thus, the brush 130 when the rotation shaft 110 rotates, performs a rotation motion integrally with the rotation shaft 110.

In addition, the sensor 180 provided to detect the real-time positions of the magnetic bodies 172 and 174 may be a hall sensor that may sense the positions of the magnetic bodies 172 and 174 using a hall effect.

The sensor 180 is buried in an inside of the holder 160 so as to detect the positions of the magnetic bodies 172 and 174 that rotate in communication with the rotation shaft 110, as illustrated in FIG. 9.

Also, wires (not shown) for supplying power to the sensor 180 are integrally installed at the inside of the holder 160 together with the wires 150 for supplying a current to the outer slip ring 140 so that the structure for the slip ring and the brush having a simple structure in which no complicated wiring is required, can be implemented.

In this way, the magnetic bodies 172 and 174 are installed between the inner slip ring 120 and the brush 130 of the WRSM, and the sensor 180 that may detect the real-time positions of the magnetic bodies 172 and 174 is installed at the holder 160 so that the structure for the slip ring and the brush of the WRSM is implemented in the form of one compact module. Thus, a package for detecting the position of the rotor can be simplified, and efficient space utilization is possible in terms of a package compared to the conventional field power supply unit and position detector.

As described above, in a structure for a slip ring and a brush of a wound rotor synchronous motor (WRSM) according to the present invention, the following useful effects can be obtained.

First, a contact area between the brush and the slip ring of the WRSM is greatly increased so that heat dissipation of a motor caused by high-current input can be minimized and damage of the motor caused by the heat dissipation can be prevented.

Second, a plurality of contact surfaces on which the brush and the slip ring of the motor contact each other, are distributed in a circumferential direction at equal intervals so that equal friction and abrasion between the brush and the slip ring are possible, and even when a part of the contact surfaces of the brush is abraded, the other part thereof is used to supplement the abraded part so that the durable reliability of the motor can be improved.

Third, even when metal foreign substances are generated due to repetitive mechanical friction and abrasion between the brush and the slip ring, the foreign substances can be smoothly discharged to an outside of the motor so that a spark can be prevented from occurring due to the foreign substances in the motor.

Fourth, the contact area between the brush and the slip ring is increased so that the axial length of the slip ring can be reduced and thus, the overall axial size of the motor can be reduced.

Fifth, even when an external load is applied to a rotation shaft of the motor, the rotation shaft of the motor can be equally and stably supported in several places through a bellows type brush structure. Furthermore, through the bellows type brush structure, a damping function can be provided to the rotation shaft of the motor so that shaking of the rotation shaft of the motor can be prevented and a rotation balance of the motor shaft can be stably maintained.

Sixth, magnetic bodies are installed between an inner slip ring and the brush, and a sensor for detecting positions of the magnetic bodies is installed at a holder so that the structure for the slip ring and the brush of the WRSM can be implemented in the form of one module and a more simplified and compact position detection package compared to the conventional art can be implemented.

Seventh, because wires for supplying power to the sensor and wires for applying a current to an outer slip ring are integrally disposed in the holder and a wiring structure of the wires can be simply realized, efficient space utilization can be implemented in terms of a package, and the entire package structure including a field power supply unit and a position detector can be simply implemented.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A structure for a slip ring and a brush of a wound rotor synchronous motor (WRSM), the structure comprising:
   an inner slip ring combined with a rotation shaft of a motor;
   a brush disposed at a circumference of the inner slip ring, wherein the brush is formed in a cylindrical shape, and a circumferential surface of the brush is form to have a plurality of ripple-shaped wrinkles contacting an outer circumferential surface of the inner slip ring formed therein;
   an outer slip ring disposed at a circumference of the brush and making in contact with the plurality of the ripple-shaped wrinkles of the brush; and
   a holder that supports the outer slip ring.

2. The structure of claim 1, wherein the ripple-shaped wrinkles of the brush are arranged in a circumferential direction at equal intervals and are in contact with the outer circumferential surface of the inner slip ring and an inner circumferential surface of the outer slip ring, respectively.

3. The structure of claim 1, wherein each of a plurality of inner slip rings, a plurality of brushes, and a plurality of outer slip rings are arranged in a lengthwise direction of the rotation shaft.

4. The structure of claim 3, wherein the plurality of brushes are arranged on the rotation shaft in a state in which the ripple-shaped wrinkles of the brushes are disposed not to cross one another.

5. The structure of claim 1, wherein accommodation grooves in which the inner slip ring, the brush and the outer slip ring are accommodated, are formed in the holder.

6. The structure of claim 5, wherein foreign substance discharge ports perforated in an axial direction to communicate with the accommodation grooves are formed in the holder.

7. The structure of claim 6, wherein a fan that induces forcible discharge of foreign substances through the foreign substance discharge ports is installed at the motor.

8. The structure of claim 1, wherein the holder is press-fitted into and combined with the motor.

9. The structure of claim 8, wherein pin grooves into which pins are press-fitted, are formed in the holder so that a position of the holder press-fitted into the motor is fixed.

10. The structure of claim 9, wherein the pin grooves are formed in an outer surface of the holder to have semicircular cross-sections.

11. The structure of claim 1, wherein magnetic bodies are installed between the inner slip ring and the brush, and a sensor for detecting positions of the magnetic bodies is installed at the holder.

12. The structure of claim 11, wherein the magnetic bodies are formed by injecting moldable magnetic materials between the inner slip ring and the brush.

13. The structure of claim 11, wherein the sensor is a hall sensor.

14. The structure of claim 11, further comprising wires for applying a current to the outer slip ring, wherein the wires are integrally installed in the holder together with wires for supplying power to the sensor.

15. A structure for a slip ring and a brush of a wound rotor synchronous motor (WRSM), the structure comprising:
   an inner slip ring combined with a rotation shaft of a motor;
   a brush disposed at a circumference of the inner slip ring, wherein the brush is formed in a cylindrical shape, and a circumferential surface of the brush is form to have a plurality of ripple-shaped wrinkles contacting an outer circumferential surface of the inner slip ring formed therein;
   an outer slip ring disposed at a circumference of the brush and making in contact with the plurality of the ripple-shaped wrinkles of the brush;
   wires for applying a current to the outer slip ring; and
   a holder that supports the outer slip ring.

* * * * *